(12) United States Patent
Todeschini

(10) Patent No.: US 9,104,929 B2
(45) Date of Patent: Aug. 11, 2015

(54) CODE SYMBOL READING SYSTEM HAVING ADAPTIVE AUTOFOCUS

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/927,398

(22) Filed: Jun. 26, 2013

(65) Prior Publication Data

US 2015/0001304 A1      Jan. 1, 2015

(51) Int. Cl.
G06K 7/10       (2006.01)
G06K 7/14       (2006.01)
G02B 3/14       (2006.01)

(52) U.S. Cl.
CPC ........ G06K 7/10811 (2013.01); G06K 7/10801 (2013.01); G02B 3/14 (2013.01); G06K 2207/1011 (2013.01)

(58) Field of Classification Search
CPC .................. G06K 7/10811; G06K 2207/1011; G06K 7/10801; G02B 3/14
USPC ................. 235/435, 439, 454, 462.01, 462.2, 235/462.21, 462.22, 462.23, 462.24
See application file for complete search history.

(56) References Cited

U.S. PATENT DOCUMENTS

| | | | |
|---|---|---|---|
| 6,336,587 B1 * | 1/2002 | He et al. | 235/462.45 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,001 B2 * | 2/2013 | Craen et al. | 235/454 |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — Thien M Le
*Assistant Examiner* — Claude J Brown
(74) *Attorney, Agent, or Firm* — Additon, Higgins & Pendleton, P.A.

(57) ABSTRACT

A system for reading code symbols includes an imaging subsystem that includes a focusing module and an image processor. The image processor selects an initial, predicted focal distance for the imaging subsystem's focusing module with respect to a code symbol. The focal distance for each successfully decoded code symbol is stored in memory, and a weighted average of a pre-selected number of memorized focal distances is used to calculate the next initial, predicted focal distance.

16 Claims, 2 Drawing Sheets

(56) References Cited

U.S. PATENT DOCUMENTS

| | | | |
|---|---|---|---|
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,608,075 B2 * | 12/2013 | Tanimoto et al. | 235/462.24 |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,651,384 B2 * | 2/2014 | Ogawa et al. | 235/454 |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 2004/0118919 A1 * | 6/2004 | Breytman et al. | 235/454 |
| 2007/0063048 A1 * | 3/2007 | Havens et al. | 235/462.46 |
| 2007/0131770 A1 * | 6/2007 | Nunnink | 235/454 |
| 2008/0185432 A1 | 8/2008 | Caballero et al. | |
| 2009/0072037 A1 * | 3/2009 | Good et al. | 235/462.35 |
| 2009/0134221 A1 | 5/2009 | Zhu et al. | |
| 2009/0166426 A1 * | 7/2009 | Giebel et al. | 235/462.42 |
| 2009/0206158 A1 * | 8/2009 | Thuries et al. | 235/454 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0138685 A1 | 6/2012 | Qu et al. | |
| 2012/0168511 A1 | 7/2012 | Kotlarsky et al. | |
| 2012/0168512 A1 | 7/2012 | Kotlarsky et al. | |
| 2012/0193407 A1 | 8/2012 | Barten | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0237193 A1 | 9/2012 | Kawarada | |
| 2012/0248188 A1 | 10/2012 | Kearney | |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0214048 A1 | 8/2013 | Wilz | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292474 A1 | 11/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306730 A1 | 11/2013 | Brady et al. | |
| 2013/0306731 A1 | 11/2013 | Pedrao | |
| 2013/0306734 A1 | 11/2013 | Xian et al. | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0313326 A1 | 11/2013 | Ehrhart | |
| 2013/0327834 A1 | 12/2013 | Hennick et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0021256 A1 | 1/2014 | Qu et al. | |
| 2014/0025584 A1 | 1/2014 | Liu et al. | |
| 2014/0027518 A1 | 1/2014 | Edmonds et al. | |
| 2014/0034723 A1 | 2/2014 | Van Horn et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |

(56) References Cited

U.S. PATENT DOCUMENTS

| | | |
|---|---|---|
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |
| 2014/0166758 A1* | 6/2014 | Goren .................. 235/462.21 |

OTHER PUBLICATIONS

U.S. Appl. No. 14/264,173 for Autofocus Lens System for Indicia Readers, filed Apr. 29, 2014, (Ackley et al.), 39 pages.
U.S. Appl. No. 14/230,322 for Focus Module and Components with Actuator, filed Mar. 31, 2014 (Feng et al.); 92 pages.
U.S. Appl. No. 14/222,994 for Method and Apparatus for Reading Optical Indicia Using a Plurality of Data, filed Mar. 24, 2014 (Smith et al.); 30 pages.
U.S. Appl. No. 14/231,898 for Hand-Mounted Indicia-Reading Device with Finger Motion Triggering, filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 13/367,978, filed Feb. 7, 2012, (Feng et al.); now abandoned.
U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control, filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.) 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.

(56) References Cited

OTHER PUBLICATIONS

U.S. Appl. No. 14/345,735 for Optical Indicia Reading Terminal with Combined Illumination, filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion, filed Mar. 4, 2014 (Lui et al.); 25 pages.

U.S. Appl. No. 14/342,544 for Imaging Based Barcode Scanner Engine with Multiple Elements Supported on a Common Printed Circuit Board, filed Mar. 4, 2014 (Liu et al.); 27 pages.

U.S. Appl. No. 14/257,174 for Reading Apparatus Having Partial Frame Operating Mode, filed Apr. 21, 2014, (Barber et al.), 67 pages.

U.S. Appl. No. 14/200,405 for Indicia Reader for Size-Limited Applications, filed Mar. 7, 2014 (Feng et al.); 42 pages.

U.S. Appl. No. 14/166,103 for Indicia Reading Terminal Including Optical Filter, filed Jan. 28, 2014 (Lu et al.); 29 pages.

Search and Exam Report in Application No. GB1410734.6, related to Current Application, Dated Dec. 18, 2014, 6 pages.

\* cited by examiner

CODE SYMBOL READING SYSTEM HAVING ADAPTIVE AUTOFOCUS

FIELD OF THE INVENTION

The present invention relates to the field of code symbol readers, more specifically, to a code symbol reading system having adaptive autofocus.

BACKGROUND

Mobile computer devices such as smartphones have become an increasingly popular way to scan code symbols (e.g., barcodes) because of their highly functional camera technology as well as their ubiquity. Generally speaking, the greatest challenge when scanning a barcode with a smartphone is first getting the barcode in focus. Presently, most smartphones utilize an autofocus routine that attempts to get an image into focus. This procedure is quite time consuming, principally because the autofocus routine initiates the process without any real sense of the proper focal distance. As a result, the smartphone often spends a great deal of time readjusting the focal distance as it searches for the proper focal setting that will bring the barcode into focus at least enough to read the barcode. Autofocus routines are often hampered in their efforts by excessive motion and poor lighting conditions. This often leads to a significant time delay when scanning a barcode and accounts for the vast majority of the overall scan time.

Therefore, a need exists for a system for reading code symbols that is capable of generating faster readings of code symbols by first making an educated guess at where the focus should be fixed before a barcode scan is attempted.

SUMMARY

Accordingly, in one aspect, the present invention embraces a system for reading code symbols having adaptive autofocus. The system for reading code symbols includes an imaging subsystem for capturing images within the imaging subsystem's field of view. The imaging subsystem includes a focusing module. The system for reading code symbols also includes an image processor. The image processor is configured for selecting an initial, predicted focal distance for the imaging subsystem's focusing module. The image processor is also configured for processing an image of a code symbol captured by the imaging subsystem in order to decode the code symbol. The image processor is also configured for storing in memory the focal distance associated with the decoded code symbol. The image processor is configured to select the initial, predicted focal distance as a function of memorized focal distance (s) associated with previously decoded code symbol(s).

In an exemplary embodiment, the image processor is configured to select the initial, predicted focal distance as a function of a plurality of memorized focal distances associated with previously decoded code symbols.

In another exemplary embodiment, the image processor is configured to perform an autofocus routine if processing the captured image of the code symbol at the initial, predicted focal distance fails to decode the code symbol.

In yet another exemplary embodiment, the image processor is configured to perform an autofocus routine if the number of memorized focal distances associated with previously decoded code symbols is less than a predetermined minimum.

In yet another exemplary embodiment, the imaging subsystem detects the presence of a code symbol within the imaging subsystem's field of view.

In yet another exemplary embodiment, the system for reading code symbols according to the present invention also includes an object detection subsystem for detecting the presence of an object (e.g., an object bearing a code symbol within the imaging subsystem's field of view.

In yet another exemplary embodiment, the system for reading code symbols according to the present invention also includes a hand-supportable housing. The imaging subsystem and image processor are disposed within the hand-supportable housing.

In yet another exemplary embodiment, the system for reading code symbols according to the present invention also includes an input/output subsystem. The input/output subsystem outputs signals from the system for reading code symbols.

In another aspect, the present invention embraces a system for reading code symbols that includes an imaging subsystem and an image processor. The imaging subsystem captures images within the imaging subsystem's field of view. The imaging subsystem includes a focusing module. The image processor is configured for selecting an initial, predicted focal distance for the imaging subsystem's focusing module with respect to a code symbol, and to process one or more images of a code symbol captured by the imaging subsystem at the initial, predicted focal distance. The image processor is configured to perform an autofocus routine if processing a predetermined number of captured images of a code symbol fails to decode the code symbol. The image processor is also configured to store in memory the focal distance associated with the decoded code symbol if processing a captured image of the code symbol decodes the code symbol. The image processor is configured to select the initial, predicted focal distance as a function of a plurality of memorized focal distances associated with previously decoded code symbols.

In an exemplary embodiment, the image processor is configured to store in memory the initial, predicted focal distance associated with the decoded code symbol if processing a captured image of a code symbol at the initial, predicted focal distance decodes the code symbol.

In another exemplary embodiment, the image processor is configured to perform an autofocus routine if the number of memorized focal distances associated with previously decoded code symbols is less than a predetermined minimum.

In yet another exemplary embodiment, the image processor is configured to process one or more additional captured images of the code symbol after the image processor performs an autofocus routine.

In yet another exemplary embodiment, the imaging subsystem detects the presence of a code symbol within the imaging subsystem's field of view.

In yet another exemplary embodiment, the system for reading code symbols according to the present invention includes an object detection subsystem for detecting the presence of a code symbol within the imaging subsystem's field of view.

In yet another exemplary embodiment, the system for reading code symbols according to the present invention includes a hand-supportable housing. The imaging subsystem and image processor are disposed within the hand-supportable housing.

In yet another exemplary embodiment, the system for reading code symbols according to the present invention includes an input/output subsystem for outputting system signals.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
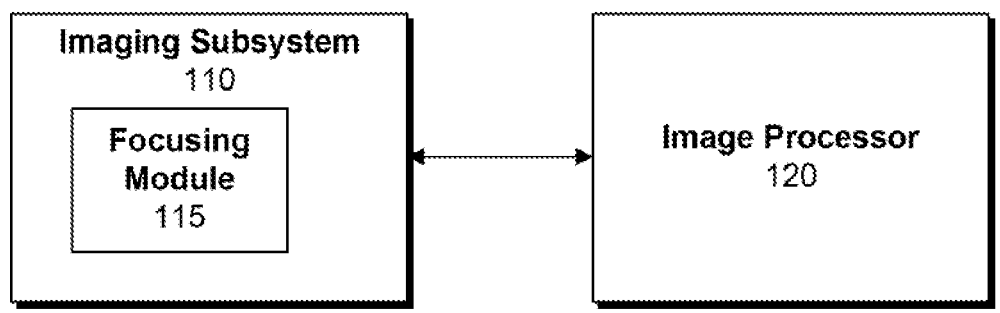
FIG. 1 is a block diagram of an exemplary system for reading code symbols according to the present invention.

The present invention embraces a system for reading code symbols. The term "code symbol" is intended broadly to refer to any indicia or device used to store information about an object, including barcodes, linear barcodes, 1D barcodes, matrix barcodes, 20 barcodes, QR codes, RFID tags, and optical character recognition (OCR) symbols. When a code symbol is read, the information encoded in the code symbol is decoded. Referring now to FIG. 1, the system 100 for reading code symbols according to the present invention includes an imaging subsystem 110. The imaging subsystem 110 captures images within the imaging subsystem's 110 field of view (i.e., angle of view). Objects that can be viewed by the imaging subsystem when it is in a given position and orientation in space are within the imaging subsystem's 110 field of view. When a user wishes to capture an image of a code symbol, the user either positions the code symbol within the imaging subsystem's 110 field of view, or re-orients the imaging subsystem 110 to change its field of view to include, the code symbol. For example, if using a camera-equipped smartphone as a code symbol reader, the user could reposition the smartphone until the code symbol comes into the field of view of the smartphone's camera.

The imaging subsystem 110 of the system 100 according to the present invention includes a focusing module 115. The focusing module 115 functions to bring into focus the code symbol of interest such that the code symbol may be read. Typically, the focusing module includes (i) a lens assembly having one or more lenses and (ii) a small autofocus motor which manipulates the lens assembly to adjust its field of focus. The autofocus motor manipulates the lens assembly by changing the distance between the lens assembly and the image plane, or by otherwise adjusting the lens configuration, to bring the code symbol into focus. Alternatively, the focusing module could include a liquid lens module. The liquid lens module has a liquid lens having a chamber containing at least one type of liquid. A liquid lens driver applies an electric current to the liquid, and can vary the focal characteristics of the liquid lens by varying the level of electric current. These types of liquid lens modules are particularly useful in smaller, mobile devices because they do not require moving parts.

The system 100 according to the present invention also includes an image processor 120. Rather than immediately initiating a potentially time-consuming autofocus routine prior to capturing an image of a code symbol, the image processor 120 first selects an initial, predicted focal distance for the imaging subsystem's 110 focusing module 120. In other words, the image processor 120 estimates the focal distance at which the system 100 should attempt to capture the image of the code symbol. The method used to estimate the focal distance is described below in detail.

After an image of a code symbol is captured by the system 100, the image processor 120 processes the image of the code symbol to decode (e.g., read) the code symbol. If the captured image of the code symbol is of sufficient quality (e.g., focal quality) to allow the image processor 120 to successfully decode the code symbol, then the image processor 120 stores in memory the focal distance associated with the decoded code symbol. In other words, when the system 100 captures an image of a code symbol, the image processor 120 (i) determines the focal distance of the focusing module at the time the image was captured, (ii) determines whether the code symbol can be decoded from the captured image, and (iii) stores in memory the focal distance of each successfully decoded code symbol at the time the image was captured. If the image processor 120 determines that the image quality is not sufficient to permit the decoding of the code symbol, the focal length associated with the unsuccessful image capture is not stored in memory. The process is repeated each time the system 100 captures an image of a code symbol, with the focal distance associated with each image capture resulting in a successful decoding being stored in memory. In this way, the system 100 creates a continuously updated record of each of the focal distances employed to decode the code symbol(s). It will be appreciated by a person of ordinary skill in the art that the number of focal distances stored in memory can vary depending on how large of a sample is desired. Prior to capturing an image of a code symbol, the image processor 120 selects the initial, predicted focal distance needed to capture an image that can successfully decode the code symbol. The initial, predicted focal distance is a function of the memorized focal distance) associated with the previously decoded code symbol(s).

In an exemplary embodiment of the system 100 for reading code symbols according to the present invention, the image processor 120 selects the initial, predicted focal distance as a function of a plurality of memorized focal distances associated with previously decoded code symbols. Typically, the image processor 120 selects the initial, predicted focal distance that will be used for the current scan operation (e.g., code symbol image capture) by calculating a weighted moving average of the memorized focal distances. Typically, the image processor 120 keeps a record of the temporal order of memorized focal distances. In other words, the image processor 120 records which focal distance is associated with the most recently captured image, which focal distance is associated with the next most recently captured image, and so on. Using this temporal information, the image processor 120 typically gives greater weight to the focal distances associated with the more recently captured images. This approach is particularly advantageous when reading code symbols from varying distances, because this weighted average approach assumes that the distance of the next code symbol to be scanned will be roughly the same as the distances of the latest successful scans. Because, in many instances, when a user is scanning multiple code symbols in succession, those code symbols will be at similar distances from the system 100, the approach of more heavily weighting the more recent scans typically yields improved results. For example, a worker holding the system in hand while scanning various boxes bearing a code symbol while the boxes are resting on a table of substantially uniform height would likely achieve improved results using this method since most of the code symbols will be at roughly the same distance from the system 100. Any weighting scheme could be applied to find an optimal balance between highly valuing the most recent focal length data while still taking into account focal length data over a longer trend. By way of example, a linear weighting system could be employed. By way of further example, the image processor 120 could employ an exponentially weighted moving average, which would place greater value on the focal distance associated with the most recent scan while taking into consideration all of the memorized focal distances.

In an exemplary embodiment, the image processor 120 first seeks to successfully decode an image by initiating a scan using the initial, predicted focal distance. If the image processor 120 fails to decode the image using the initial, predicted focal distance (for example, because the image is out of focus), the image processor retries the scan attempt using a traditional autofocus routine. In this way, the system 100 seeks to expedite the scanning process by first attempting to decode the code symbol using the faster, educated estimate approach described herein; if that approach is not successful, the system 100 falls back on a traditional autofocus routine.

In another exemplary embodiment, the image processor 120 first checks to see if a sufficiently large sample size of focal distances are stored in memory. If less than a predetermined minimum number of memorized focal distances associated with previously decoded code symbols reside in memory, then the image processor 120 does not attempt to generate an initial, predicted focal distance. Instead, the image processor 120 goes directly to the traditional autofocus routine to attempt to decode the code symbol. In this way, if the available data set of focal distances is below a predetermined minimum number deemed to be sufficient to generate a reliable (e.g., useful) initial, predicted focal distance, the image processor 120 will not waste time or system resources on an estimation step that is unlikely to yield an image with a suitable focal quality.

In an exemplary embodiment, the imaging subsystem 110 detects the presence of a code symbol within the imaging subsystem's 110 field of view. The presence of a code symbol may be detected by an analysis of the image pixels by the imaging subsystem 110 to determine if they are consistent with the presence of a code symbol. This analysis may be capable of detecting the presence of a code symbol even when the image quality is insufficient to support reading the code symbol. If the imaging subsystem 110 detects a code symbol within the field of view of the imaging subsystem 110, it initiates an image capture using the focal distance estimating techniques described herein.

Figure 2:
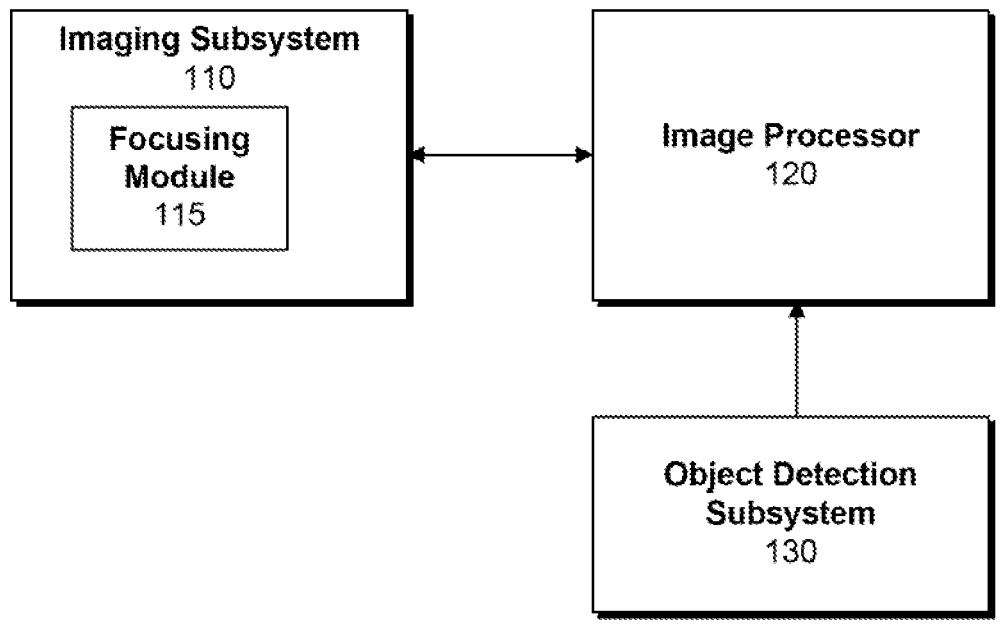
FIG. 2 is a block diagram of a first alternative embodiment of the system for reading code symbols according to the present invention.

Referring now to FIG. 2, in an alternative embodiment, the system 100 for reading code symbols includes an object detection subsystem 130 for detecting the presence of an object (e.g., an object bearing a code symbol) within the system's 100 field of view. The object detection subsystem can project an IR-based light beam into the field of view and detect a return signal from an object present in the field of view to detect the presence of that object. Upon detection of an object, the system 100 may initiate the attempted reading of a code symbol (s) within the field of view using the adaptive focusing techniques described herein.

Figure 3:
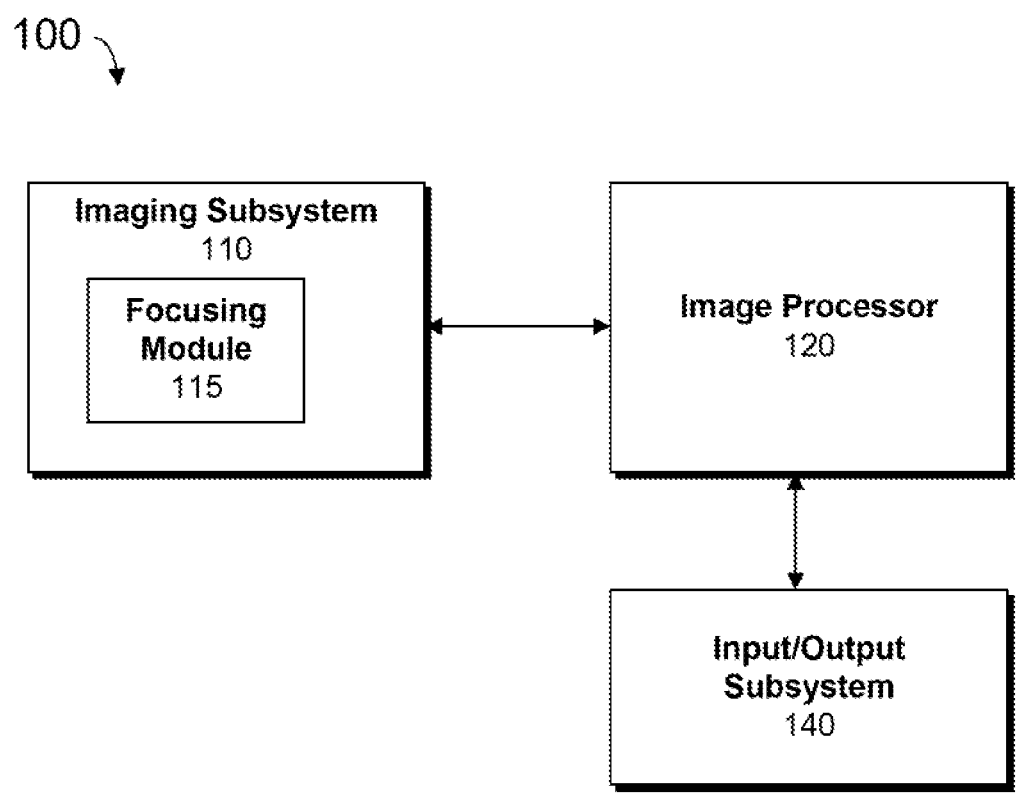
FIG. 3 is a block diagram of a second alternative embodiment of the system for reading code symbols according to the present invention.

Whether by successfully relying on the initial, predicted focal distance, or by falling back on a traditional autofocus routine, the system 100 ultimately obtains a successful scan of the code symbol. When the code symbol is decoded, the system 100 will need to output the resulting data (e.g., the data decoded from the code symbol) to another system (e.g., a data processing system). The data processing system may be housed either within the same device that houses the system 100 for reading code symbols, or it may be housed in a separate device (e.g., a host device). Referring now to FIG. 3, to output the system signals (e.g., data, bits, electrical signals) representing the data generated by decoding the code symbol, the system 100 includes an input/output subsystem 140. The input/output subsystem 140 manages the sending of system signals to other systems and/or devices.

The system 100 for reading code symbols according to the present invention may take a variety of forms. For instance, the system 100 may be a stationary unit at a checkout register (e.g., point of sale (POS)), similar to a bioptic scanner found in most grocery stores. More typically, the system 100 for reading code symbols according to the present invention will take the form of a hand-held device such as a smartphone, a tablet computer, or a hand-held scanner. For hand-held devices, the system 100 according to the present invention includes a hand-supportable housing in which the imaging subsystem 110 and the image processor 120 are disposed.

In another aspect, the present disclosure embraces a system 100 for reading code symbols that includes an imaging subsystem 110 and an image processor 120. The image processor 120 selects an initial, predicted focal distance for the imaging subsystem's 110 focusing module with respect to a code symbol. The image processor 120 processes one or more images of the code symbol captured by the imaging subsystem 110 at the initial, predicted focal distance. If, after processing a predetermined number of captured images of the code symbol, the image processor 120 fails to decode the code symbol, then the image processor 120 performs an autofocus routine. On the other hand, if the image processor 120 is able to decode a code symbol from a captured image, then the image processor 120 stores in memory the focal distance associated with the decoded code symbol. The image processor 120 selects the initial, predicted focal distance as a function of a plurality of memorized focal distances associated with previously decoded code symbols.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,463; U.S. Pat. No. 8,331,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,363; U.S. Pat. No. 8,459,557; U.S. Pat. No. 8,469,272; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248183; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318369; U.S. Patent Application Publication No. 2013/0043312; U.S. Patent Application Publication No. 2013/0060840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/730,356 for a Mobile Device Having Object-Identification Interface, filed Feb. 28, 2013 (Samek et al.); U.S. patent application Ser. No. 13/780,150 for a Distraction Avoidance System, filed Feb. 28, 2013 (Sauerwein); U.S. patent application Ser. No. 13/784,933 for an integrated Dimensioning and Weighing System, filed Mar. 5, 2013 (McCloskey et al.); U.S. patent application Ser. No. 13/735,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/730,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,246 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D imaging Device, filed Jun. 7, 2013 (Jovanovski et al.) and U.S. patent application Ser. No. 13/912,702 for a System and Method for Reading Code Symbols at Long Range Using Source Power Control, filed Jun. 7, 2013 (Xian et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for reading code symbols, comprising:
   an imaging subsystem for capturing images within the imaging subsystem's field of view, the imaging subsystem including a focusing module; and
   an image processor configured for:
   selecting an initial, predicted focal distance for the imaging subsystem's focusing module;
   processing an image of a code symbol captured by the imaging subsystem in order to decode the code symbol; and
   storing in memory the focal distance associated with the decoded code symbol;
   wherein the image processor is configured to select the initial, predicted focal distance as a function of memorized focal distance(s) associated with previously decoded code symbol(s).

2. The system for reading code symbols according to claim 1, wherein the image processor is configured to select the initial, predicted focal distance as a function of a plurality of memorized focal distances associated with previously decoded code symbols.

3. The system for reading code symbols according to claim 1, wherein the image processor is configured to perform an autofocus routine if processing the captured image of the code symbol at the initial, predicted focal distance fails to decode the code symbol.

4. The system for reading code symbols according to claim 1, wherein the image processor is configured to perform an autofocus routine if the number of memorized focal distances associated with previously decoded code symbols is less than a predetermined minimum.

5. The system for reading code symbols according to claim 1, wherein the imaging subsystem detects the presence of a code symbol within the imaging subsystem's field of view.

6. The system for reading code symbols according to claim 1, comprising an object detection subsystem for detecting the presence of an object within the imaging subsystem's field of view.

7. The system for reading code symbols according to claim 1, comprising a hand-supportable housing, wherein the imaging subsystem and image processor are disposed within the hand-supportable housing.

8. The system for reading code symbols according to claim 1, comprising an input/output subsystem for outputting system signals.

9. A system for reading code symbols, comprising:
an imaging subsystem for capturing images within the imaging subsystem's field of view, the imaging subsystem including a focusing module; and
an image processor configured for:
selecting an initial, predicted focal distance for the imaging subsystem's focusing module with respect to a code symbol;
processing one or more images of a code symbol captured by the imaging subsystem at the initial, predicted focal distance;
if processing a predetermined number of captured images of a code symbol fails to decode the code symbol, then performing an autofocus routine; and
if processing a captured image of the code symbol decodes the code symbol, then storing in memory the focal distance associated with the decoded code symbol;
wherein the image processor is configured to select the initial, predicted focal distance as a function of a plurality of memorized focal distances associated with previously decoded code symbols.

10. The system for reading code symbols according to claim 9, wherein the image processor is configured to store in memory the initial, predicted focal distance associated with the decoded code symbol if processing a captured image of a code symbol at the initial, predicted focal distance decodes the code symbol.

11. The system for reading code symbols according to claim 9, wherein the image processor is configured to perform an autofocus routine if the number of memorized focal distances associated with previously decoded code symbols is less than a predetermined minimum.

12. The system for reading code symbols according to claim 9, wherein, the image processor is configured to process one or more additional captured images of the code symbol after the image processor performs an autofocus routine.

13. The system for reading code symbols according to claim 9, wherein the imaging subsystem detects the presence of a code symbol within the imaging subsystem's field of view.

14. The system for reading code symbols according to claim 9, comprising an object detection subsystem for detecting the presence of a code symbol within the imaging subsystem's field of view.

15. The system for reading code symbols according to claim 9, comprising a hand-supportable housing, wherein the imaging subsystem and image processor are disposed within the hand-supportable housing.

16. The system for reading code symbols according to claim 9, comprising an input/output subsystem for outputting system signals.

* * * * *